United States Patent
Fu et al.

(10) Patent No.: US 7,129,677 B2
(45) Date of Patent: Oct. 31, 2006

(54) VECTOR CONTROLLER, A POLYPHASE SYNCHRONOUS RECTIFIER, AND A METHOD OF VECTOR-CONTROLLING THEREOF

(75) Inventors: Minghua Fu, Plano, TX (US); Ron Ye, Richardson, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 297 days.

(21) Appl. No.: 10/801,788

(22) Filed: Mar. 16, 2004

(65) Prior Publication Data

US 2005/0207192 A1  Sep. 22, 2005

(51) Int. Cl.
*H02M 7/217* (2006.01)

(52) U.S. Cl. .......................... 323/89; 323/127

(58) Field of Classification Search .................. 363/89, 363/127
See application file for complete search history.

(56) References Cited

U.S. PATENT DOCUMENTS

| | | | | |
|---|---|---|---|---|
| 4,984,147 A | * | 1/1991 | Araki | .......................... 363/84 |
| 5,140,514 A | * | 8/1992 | Tuusa et al. | .................. 363/81 |
| 5,177,677 A | * | 1/1993 | Nakata et al. | ................ 363/89 |
| 5,880,947 A | * | 3/1999 | Imanaka et al. | .............. 363/89 |
| 6,297,980 B1 | * | 10/2001 | Smedley et al. | .............. 363/89 |
| 6,337,801 B1 | * | 1/2002 | Li et al. | ...................... 363/127 |
| 6,459,596 B1 | * | 10/2002 | Corzine | ....................... 363/37 |
| 6,507,505 B1 | * | 1/2003 | Oka et al. | ...................... 363/47 |
| 6,594,164 B1 | * | 7/2003 | Suzuki | ........................ 363/69 |
| 6,757,185 B1 | * | 6/2004 | Rojas Romero | ............. 363/89 |

* cited by examiner

*Primary Examiner*—Jeffrey Sterrett

(57) ABSTRACT

A vector controller for a polyphase synchronous rectifier, a method of vector-controlling a polyphase synchronous rectifier, and a synchronous rectifier incorporating the vector controller or the method. In one embodiment, the vector controller includes: (1) an input line voltage detector configured to detect voltages on at least two rectifier input lines and produce therefrom a neutral excursion vector and (2) a neutral excursion compensator, coupled to said input line voltage detector, that applies said neutral excursion vector to a partially compensated drive vector to yield an excursion-compensated drive vector suitable for generation of excursion-compensated pulse-width modulated drive signals for said synchronous rectifier.

17 Claims, 4 Drawing Sheets

VECTOR CONTROLLER, A POLYPHASE SYNCHRONOUS RECTIFIER, AND A METHOD OF VECTOR-CONTROLLING THEREOF

TECHNICAL FIELD OF THE INVENTION

The present invention is directed, in general, to power rectifiers and, more specifically, to a vector controller for a polyphase synchronous rectifier, a method of vector-controlling a polyphase synchronous rectifier, and a synchronous rectifier incorporating the same.

BACKGROUND OF THE INVENTION

Polyphase synchronous rectifiers are used throughout the power electronic industry to convert an input AC voltage to an output DC voltage. Three-phase converter circuits, for example, are used to convert voltage in such applications as motor drives and Uninterruptible Power Supply (UPS). A conventional three-phase boost rectifier circuit typically includes AC to DC circuitry of active and passive components such as an input inductance, power switches and an energy storage device (commonly a capacitor). Often, the AC to DC circuitry is connected to a DC to DC converter for additional conversion and to a controller for controlling the operation of the power switches. To provide a desired output DC voltage and unity power factor, the controller employs different control schemes based on the input AC voltage and feedback from the output DC voltage and AC input current. One control scheme presently employed in three-phase boost rectifier circuits is a vector control scheme.

Embodied within a Digital Signal Processor (DSP), the vector control scheme can be implemented with great flexibility to achieve a high dynamic performance. The vector control scheme includes a voltage loop to regulate the output DC voltage and current loops to control input AC currents. Additionally, the vector control scheme includes a zero crossing detector that detects a phase on an input AC supply line and produces a zero-crossing signal for a 3-2 transform circuit and a 2-3 transform circuit within the current control loops. The transform circuits provide an interface between a three-phase stationary frame (real world) and a two-phase rotational reference frame. Transforming to the two-phase rotational frame allows manipulation of vectors representing the input currents, input voltages and error currents to provide control for the power switches to obtain the desired AC currents and output DC voltage.

The rotational reference frame, such as a d-q frame with perpendicular d and q axes, is adopted and locked to an input AC voltage vector V to provide a reference for the vector control scheme. To obtain a unity power factor, a reference vector I* will be in phase with the voltage vector V in the d-axis. The current controllers generate required voltages $V_d$ and $V_q$ from error current components in the d and q axes that pass therethrough. The 2-3 transform circuit will receive the required voltages $V_d$ and $V_q$ and generate a terminal voltage drive vector $V_t$ that is applied to the AC to DC circuit through Pulse Width Modulation (PWM) to control operation of the power switches.

Generally, conventional vector control schemes as discussed above are sufficient when the input AC voltage is symmetric. Unfortunately, when an input AC voltage source is non-ideal (asymmetric or unbalanced), current distortion occurs with conventional vector control schemes.

Accordingly, what is needed in the art is an improved apparatus or method to control poly-phase rectification. More specifically, a poly-phase rectifier controller is needed that reduces current distortion even with an asymmetric input AC voltage.

SUMMARY OF THE INVENTION

To address the above-discussed deficiencies of the prior art, the present invention provides, in one aspect, a vector controller for a three-phase synchronous rectifier under symmetric or asymmetric line conditions. In one embodiment, the vector controller includes: (1) an input line voltage detector configured to detect voltages on at least two rectifier input lines and produce therefrom a neutral excursion vector and (2) a neutral excursion compensator, coupled to the input line voltage detector, that applies the neutral excursion vector to a partially compensated drive vector to yield an excursion-compensated drive vector suitable for generation of excursion-compensated pulse-width modulated drive signals for the synchronous rectifier.

The present invention recognizes that current distortion may be reduced in a poly-phase rectifier with a vector control scheme by sensing and computing a negative sequence input voltage to apply to a pulse-width modulated drive signal. Additionally, the present invention also recognizes that unique properties of a vector control scheme allow compensating for the negative sequence without actually computing the negative sequence. Instead, the present invention reduces current distortion even with an unbalanced input AC voltage by compensating for a negative sequence (neutral excursion compensator) with an additional feed forward voltage loop.

The present invention provides, in another aspect, a method of vector-controlling a three-phase synchronous rectifier. In one embodiment, the method includes: (1) detecting voltages on at least two rectifier input lines, (2) producing therefrom a neutral excursion vector and (3) applying the neutral excursion vector to a partially compensated drive vector to yield an excursion-compensated drive vector suitable for generation of excursion-compensated pulse-width modulated drive signals for the synchronous rectifier.

The present invention provides, in yet another aspect, a three-phase synchronous rectifier. In one embodiment, the synchronous rectifier includes: (1) a plurality of power switches interposing three rectifier input lines and two rectifier output lines and (2) a vector controller, including: (2a) an input line voltage detector configured to detect voltages on at least two of the rectifier input lines and produce therefrom a neutral excursion vector, (2b) a neutral excursion compensator, coupled to the input line voltage detector, that applies the neutral excursion vector to a partially compensated drive vector to yield an excursion-compensated drive vector and (2c) a pulse-width modulated drive signal generator configured to produce excursion-compensated pulse-width modulated drive signals from the excursion-compensated drive vector and drive the plurality of drive switches based thereon.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
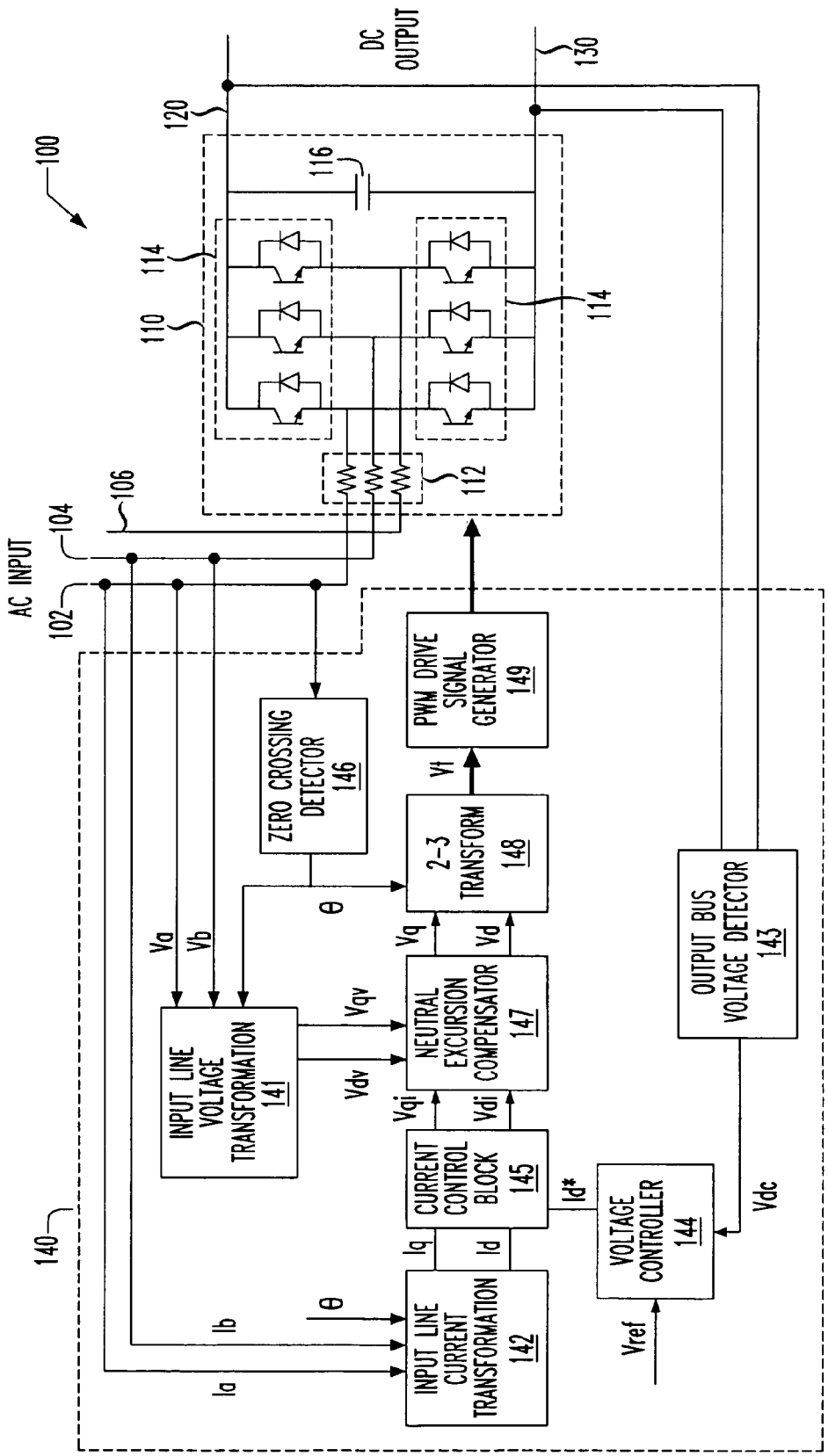
FIG. 1 illustrates a block diagram of an embodiment of a three-phase synchronous rectifier constructed according to the principles of the present invention.

Referring initially to FIG. 1, illustrated is a block diagram of an embodiment of a three-phase synchronous rectifier, generally designated 100, constructed according to the principles of the present invention. The synchronous rectifier 100 includes a first, a second and a third rectifier input line 102, 104, 106, AC/DC conversion circuitry 110, a first and second rectifier output line 120, 130, and a vector controller 140. The vector controller 140 includes an input line voltage transformation 141, an input line current transformation 142, an output bus voltage detector 143, a voltage controller 144, a current control block 145, a zero crossing detector 146, a neutral excursion compensator 147, a 2-3 transform 148 and a pulse-width modulated drive signal generator 149.

The synchronous rectifier 100 is a three-phase boost rectifier that converts an AC three-phase input voltage to a desired DC output voltage. The AC three-phase input voltage is received by the synchronous rectifier 100 via the three rectifier input lines 102, 104, 106. The synchronous rectifier 100 reduces current distortion of the desired DC output voltage even when the AC three-phase input voltage is unbalanced. The synchronous rectifier 100 may provide the desired DC voltage for various devices, such as, a DC/DC converter or a motor drive. One skilled in the art will understand, however, that the synchronous rectifier 100 may be employed in other devices.

The AC/DC conversion circuitry 110 is a hardwired circuitry of passive and active components that receives the AC three-phase input voltage and provides the desired DC output voltage on the first and second rectifier output lines 120, 130. The AC/DC conversion circuitry 110 includes an input inductance 112, a plurality of power switches 114 and an energy storage device 116. The input inductance 112 is coupled to the AC three-phase input voltage to control input currents. Also coupled to the input inductance 112 are the plurality of power switches 114. The plurality of power switches 114 interpose the three rectifier input lines 102, 104, 106 and the first and second rectifier output lines 120, 130. Through operations of the plurality of power switches 114, the AC three-phase input voltage is provided to the energy storage device 116. From the energy storage device 116, the desired DC output voltage is provided on the first and second rectifier output lines 120, 130. Typically, the first and second rectifier output lines 120, 130, are coupled to a DC/DC converter that provides further voltage conversion.

The components of the AC/DC conversion circuitry 110 may be conventional components typically employed within a three-phase AC to DC converter. For example, the input inductance 112 may be an inductor on each phase of the AC three-phase input voltage, the plurality of power switches 114 may be power transistors parallel-coupled to diodes and the energy storage device 116 may be a capacitor. One skilled in the art will understand the configuration and operation of the AC/DC conversion circuitry 110 and that other component not illustrated or discussed may be included therein.

The vector controller 140 controls the operation of the AC/DC conversion circuitry 110 employing a vector control scheme. The vector controller 140 may be embodied in a DSP to allow control flexibility and achieve high dynamic performance. The vector controller 140 controls operation of the AC/DC conversion circuitry 110 by turning on/off the plurality of power switches 114 to direct the supply of the AC input three-phase voltage to the energy storage device 116.

The input line voltage transformation 141 is configured to detect voltages on the first and second rectifier input lines 102, 104, and produce therefrom a neutral excursion vector. The input line voltage transformation 141 is a 3-2 transform that converts three-phase variables in a stationary frame to two-phase variables in a rotational reference frame. The rotational reference frame may be presented as a d-q frame with a q axis perpendicular to a d axis. The neutral excursion vector is the detected input line voltage represented in the rotational reference frame by $V_{dv}$, $V_{dq}$, in FIG. 1.

The input line current transformation 142 is configured to detect currents on the first and second rectifier input lines 102, 104, and produce therefrom an uncompensated drive vector. The input line current transformation 142, similar to the input line voltage transformation 141, is a 3-2 transform that converts three-phase variables in the stationary frame to two-phase variables in the rotational reference frame. The uncompensated drive vector is the actual current detected on the input lines represented in the rotational reference frame by $I_d$, $I_q$, in FIG. 1.

The output bus voltage detector 143 is configured to detect a bus voltage across the first and second rectifier output lines 120, 130, and produce therefrom a DC bus voltage. The voltage controller 144, coupled to the output bus voltage detector 143, produces a current reference from the DC bus voltage and a reference voltage. The current control block 145, coupled to the output bus voltage detector 143 and the voltage controller 144, is configured to apply a reference current vector based on the current reference to the uncompensated drive vector to yield a partially compensated drive vector. The reference current vector, as discussed below with respect to FIG. 2, is decomposed into two-phase rotational reference components $I_d^*$ and $I_q^*$.

The zero crossing detector 146 is configured to detect a phase angle from the rectifier input lines 102, 104, and produce therefrom a zero-crossing signal for the input line voltage transformation 141, input line current transformation 142 and the 2-3 transform 148. The neutral excursion compensator 147, coupled to the input line voltage transformation 141, is configured to apply the neutral excursion vector to the partially compensated drive vector to yield an excursion-compensated drive vector. The 2-3 transform 148 transforms the excursion-compensated drive vector into signals suitable for the pulse-width modulated drive signal generator 149. The pulse-width modulated drive signal generator 149 is configured to produce excursion-compensated pulse-width modulated drive signals from the excursion-compensated drive vector and drive the plurality of power switches 114 based thereon.

Figure 2:
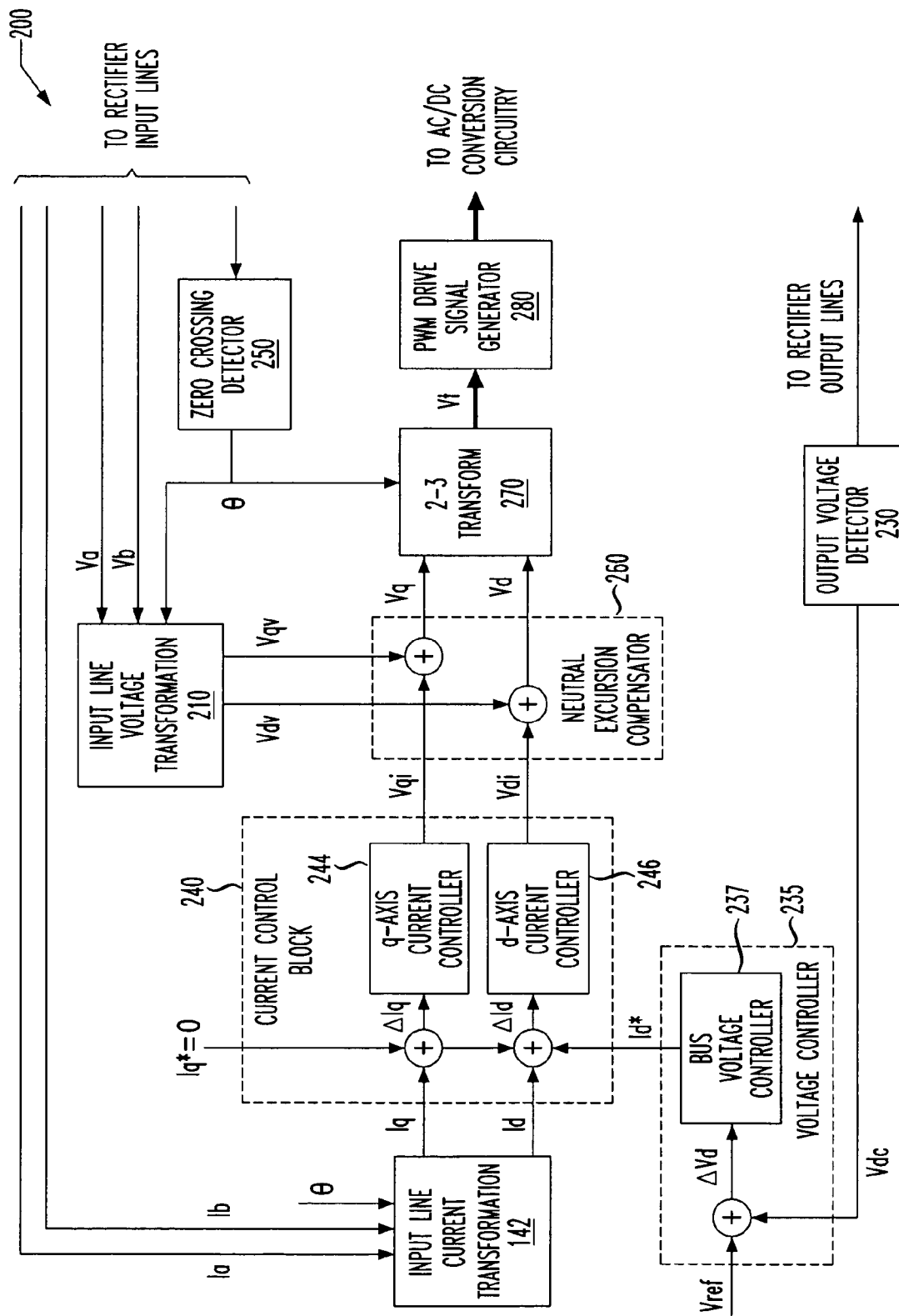
FIG. 2 illustrates a block diagram of an embodiment of a vector controller for a polyphase synchronous rectifier, or more specifically, a three-phase synchronous rectifier, constructed according to the principles of the present invention.

FIG. 2 illustrates a block diagram of an embodiment of a vector controller for a three phase synchronous rectifier, generally designated 200, constructed according to the principles of the present invention. The vector controller 200 includes an input line voltage transformation 210, an input line current transformation 220, an output voltage detector 230, a voltage controller 235, a current control block 240, a zero crossing detector 250, a neutral excursion compensator 260, a 2-3 transform 270 and a pulse-width modulated drive signal generator 280.

The vector controller 200 provides a vector control scheme to control the operation of power switches of a polyphase synchronous rectifier. The vector controller 200 may be employed as part of a three-phase synchronous rectifier as illustrated in FIG. 1. The vector controller 200 controls operation of the power switches based on inputs from rectifier input lines and rectifier output lines. In one embodiment, the vector controller 200 is coupled to only two rectifier input lines. The vector controller 200 may be implemented as a series of operating instructions, designated hardware or a combination thereof. The vector controller 200 may be implemented as a series of algorithms embodied in a DSP. Of course, the vector controller 200 may be implemented in other circuitry including but not limited to an application specific integrated circuit (ASIC) or a field programmable gate array (FPGA).

The input line voltage transformation 210 is configured to detect voltages on at least two rectifier input lines and produce therefrom a neutral excursion vector represented as $V_{dv}$ and $V_{qv}$ in FIG. 2. The input line voltage transformation 210 also employs a zero-crossing signal received from the zero-crossing detector 250 to decompose the AC input voltage into the neutral excursion vector. The neutral excursion vector is in the two-phase rotational reference frame and is represented as $V_{dv}$ and $V_{qv}$ in FIG. 2.

The input line current transformation 220 is configured to detect currents on the at least two rectifier input lines and produce therefrom an uncompensated drive vector from the actual currents. The input line current transformation 220 employs phase information from the zero-crossing detector 250 to convert an AC input current vector into an uncompensated drive vector represented in the two-phase rotational reference frame d-q as $I_d$ and $I_q$ in FIG. 2. Both the input line voltage transformation 210 and the input line current transformation 220 may be conventional 3-2 transform circuits that convert three-phase variables to the two-phase rotational reference frame d-q.

The output voltage detector 230, coupled to the output rectifier lines, is configured to detect a bus voltage of the synchronous rectifier and produce therefrom a DC bus voltage represented by $V_{dc}$ in FIG. 2. The output voltage detector 230 may employ components commonly found in conventional DC voltage detectors. The output voltage detector 230 is coupled to the voltage controller 235 that is configured to compare the DC bus voltage with a reference voltage to provide an error voltage $\Delta V_d$. The voltage controller 235 includes a bus voltage controller 237 that, based on the error voltage $\Delta V_d$, generates a rotational reference frame component $I_d^*$ of a reference current vector. The reference current vector component $I_d^*$ is a positive sequence vector in phase with the d axis. The bus voltage controller 237 may be a Proportional Integration Differential (PID) controller that sums a proportional, an integral and a differential of the input error voltage to produce the reference current vector component $I_d^*$. The integration portion of the PID controller readily compensates any constant and will reduce chances of a steady state error.

The current control block 240, coupled to the input line voltage detector 220 and the voltage controller 235, is configured to apply the reference current vector based on the DC bus voltage to the uncompensated drive vector to yield a partially compensated drive vector represented as $V_{qi}$ and $V_{di}$ in FIG. 2. The reference current vector component $I_d^*$ is in phase with the d-axis and the reference current vector component $I_q^*$ is zero.

The current control block 240 compares the reference current vector with the uncompensated drive vector to produce error currents $\Delta I_q$ and $\Delta I_d$. The current control block 240 includes a q-axis current controller 244 and a d-axis current controller 246 that receive the error currents and generate the partially compensated drive vector. The current controllers 244, 246, may also be PID current controllers. One skilled in the art will understand the operation and configuration of PID current controllers.

The zero crossing detector 250 is configured to detect phases on the rectifier input lines and produce therefrom a phase angle represented as θ in FIG. 2. The phase angle θ is employed by the input line voltage transformation 210, the input line current transformation 220 and the 2-3 transform 270 for conversions between the three-phase stationary frame and the two-phase rotational reference frame. The zero crossing detector 250 is coupled to at least one of the rectifier input lines that is coupled to the input line voltage transformation 210 and input line current transformation 220.

The neutral excursion compensator 260, coupled to the input line voltage transformation 210, is configured to apply the neutral excursion vector to the partially compensated drive vector. This yields an excursion-compensated drive vector that is suitable for generation of excursion-compensated pulse-width modulated drive signals to be used by the synchronous rectifier. More specifically, the neutral excursion compensator 260 combines the d and q axis components of the neutral excursion vector $V_{dv}$, $V_{qv}$, with the partially compensated drive vector $V_{qi}$, $V_{di}$, to yield the excursion-compensated drive vector represented by $V_q$ and $V_d$ in FIG. 2. The excursion-compensated drive vector is then provided to the 2-3 transform 270.

The 2-3 transform 270 is configured to transform the excursion-compensated drive vector into signals suitable for a pulse-width modulated drive signal generator. The 2-3 transform circuit 270 converts the excursion-compensated drive vector from the two-phase rotational reference frame to the three-phase stationary frame. One skilled in the art will understand the operation and configuration of the 2-3 transform circuit 270 in addition to 3-2 transform circuits.

The pulse-width modulated drive signal generator 280 is configured to generate excursion-compensated pulse-width modulated drive signals for the synchronous rectifier. The pulse-width modulated drive signal generator 280 may be a conventional sine/Δ pulse-width modulated signal generator, a space vector pulse-width modulated (SVPWM) signal generator or another type of pulse-width modulated signal generator that generates drive signals from a three-phase vector input.

Figure 3:
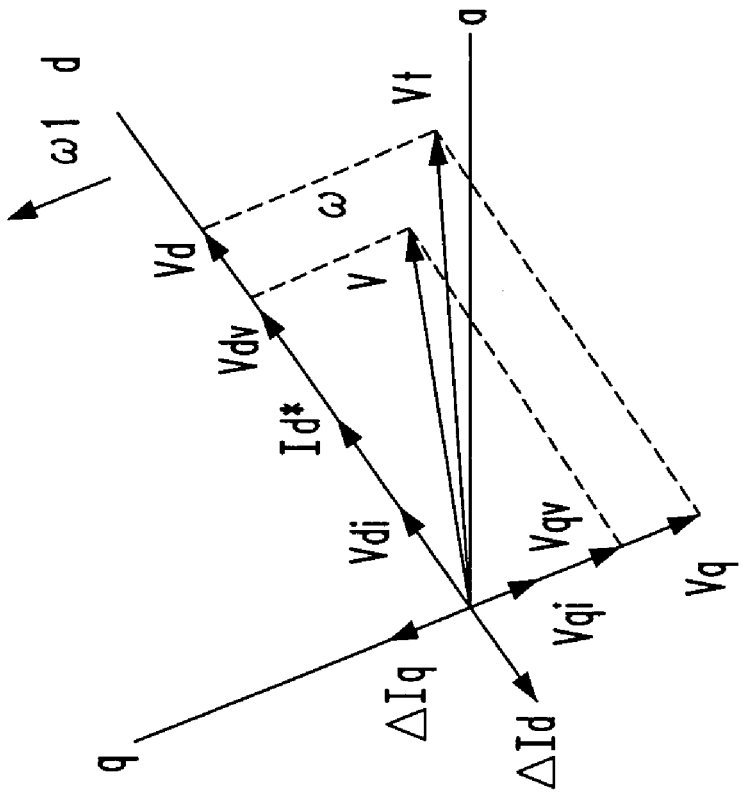
FIG. 3 illustrates an embodiment of a vector control scheme represented on a d-q rotational reference frame that the vector controller of FIG. 2 may employ.
Figure 3:
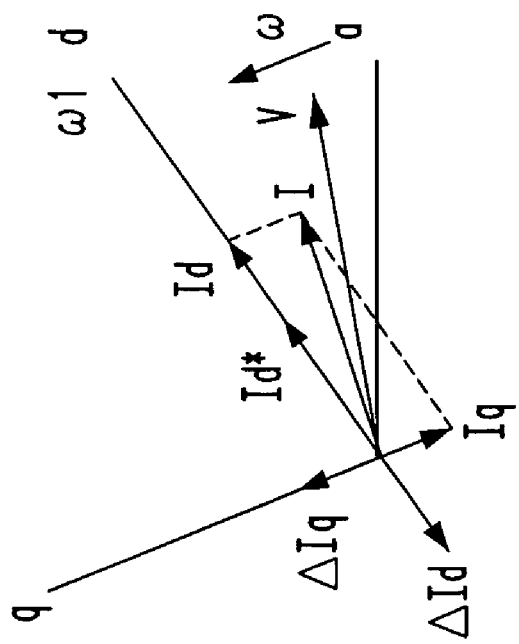

FIG. 3 illustrates an embodiment of a vector control scheme represented on a d-q rotational reference frame that the vector controller of FIG. 2 may employ. The rotational reference frame d-q is synchronous to a positive sequence rotating at a fundamental angular speed ω1. An asymmetric AC input voltage V received on the rectifier input lines is rotating at angular speed ω. As with a conventional vector control scheme, the reference current vector component $I_d^*$ is a positive sequence vector in phase with the d-axis. After comparing the reference current to the uncompensated drive vector I (its d-q components $I_d$, $I_q$), error currents $\Delta I_d$, $\Delta I_q$, are generated. The current controllers 244, 246, within the current control block 240 generate the partially compensated drive vector $V_{di}$, $V_{qi}$ from the current errors.

AC voltage vector V is also decomposed in d-q frame to the neutral excursion vector $V_{dv}$, $V_{qv}$. Since d-axis is locked to the positive sequence, $V_{qv}$ should only contain the negative sequence, and $V_{dv}$ should contain both positive and negative sequences. By combining the partially compensated drive vector $V_{di}$, $V_{dv}$, and the neutral excursion vector $V_{dv}$, $V_{qv}$, together, the excursion-compensated drive vector $V_d$, $V_q$, is obtained. The 2-3 transform 270 converts the excursion-compensated drive vector $V_d$, $V_q$, to a terminal voltage vector $V_t$ that is suitable for a pulse-width modulated drive signal generator.

Figure 4:
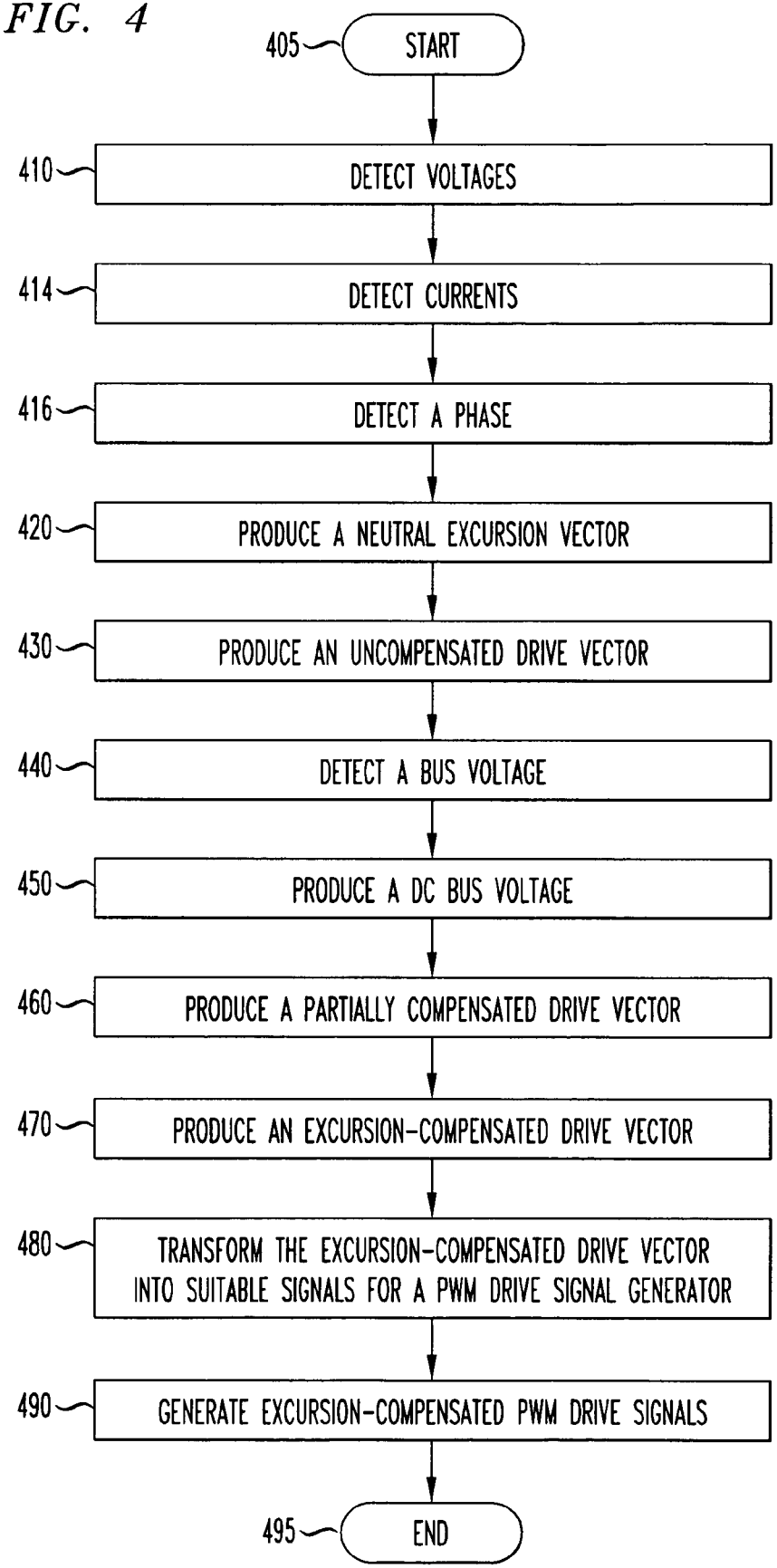
FIG. 4 illustrates a flow diagram of one embodiment of a method of vector-controlling a polyphase synchronous rectifier carried out according to the principles of the present invention.

FIG. 4 illustrates a flow diagram of one embodiment of a method of vector-controlling a polyphase synchronous rectifier, generally designated 400, carried out according to the principles of the present invention. The method begins with an intent to vector-control the rectifier in a step 405.

After starting, voltages are detected on two rectifier input lines in a step 410. The rectifier may be a three-phase boost rectifier and the voltages may be detected on a first and second rectifier input line. The voltages may detected employing a conventional AC voltage detector. Currents are then detected on the two rectifier input lines in a step 414. The currents may be detected employing a conventional AC current detector.

After detecting the currents, a phase angle is detected from the two rectifier input lines in a step 416. The phase may be detected by a conventional zero-crossing detector. After detecting the phase, the phase angle is produced from the detected phase in a step 416. The zero-crossing detector may also produce the zero-crossing signal that represents when a phase crosses the zero axis.

After producing the phase angle, a neutral excursion vector is produced from the detected voltages and the zero-crossing signal in a step 420. An input line voltage transformation may be employed to detect the voltages and convert the detected voltages into a two-phase rotational reference frame.

After producing the neutral excursion vector, an uncompensated drive vector is produced from the detected currents and the zero-crossing signal in a step 430. The uncompensated drive vector may be produced by a input line current transformation that detects and also converts the detected currents into the two-phase rotational reference frame.

After producing the uncompensated drive vector, a bus voltage of the synchronous rectifier is detected in a step 440. The bus voltage is a DC voltage detected on output lines of the synchronous rectifier. An output voltage detector may be used to detect the bus voltage.

After detecting the bus voltage, the DC bus voltage is produced in a step 450. The output voltage detector may produce the DC bus voltage from the detected bus voltage. After producing the DC bus voltage, a reference current vector based on the DC bus voltage is applied to the uncompensated drive vector to yield a partially compensated drive vector in a step 460. A current control block may produce the partially compensated drive vector. The reference current vector may be produced from a PID controller based on an error voltage produced by comparing the DC bus voltage and a reference voltage.

After producing the partially compensated drive vector, the neutral excursion vector is applied to the partially compensated drive vector to yield an excursion-compensated drive vector in a step 470. The excursion-compensated drive vector is suitable for generation of excursion-compensated pulse-width modulated drive signals for the synchronous rectifier. A neutral excursion compensator may be employed to produce the excursion-compensated drive vector.

After producing the excursion-compensated drive vector, the excursion-compensated drive vector is transformed into signals suitable for a pulse-width modulated drive signal generator in a step 480. A 2-3 transform may transform the excursion-compensated drive vector into the suitable drive signals. The excursion-compensated pulse-width modulated drive signals are then generated for the synchronous rectifier in a step 490. A conventional pulse-width modulated drive signal generator may be employed to generate the drive signals. For example, a sine/Δ or SVPWM generator may be used. After generating the excursion-compensated pulse-width modulated drive signals, the method 400 ends in a step 495.

Although the present invention has been described in detail, those skilled in the art should understand that they can make various changes, substitutions and alterations herein without departing from the spirit and scope of the invention in its broadest form.

What is claimed is:

1. A vector controller for a polyphase synchronous rectifier, comprising:
   an input line voltage detector configured to detect voltages on at least two rectifier input lines and produce therefrom a neutral excursion vector;
   an input line current detector configured to detect currents on at least two of said rectifier input lines and produce therefrom an uncompensated drive vector; and
   a neutral excursion compensator, coupled to said input line voltage detector and said input line current detector, that applies said neutral excursion vector to a partially compensated drive vector to yield an excursion-compensated drive vector suitable for generation of excursion-compensated pulse-width modulated drive signals for said synchronous rectifier.

2. The controller as recited in claim 1 further comprising a pulse-width modulated drive signal generator configured to generate said excursion-compensated pulse-width modulated drive signals for said synchronous rectifier.

3. The controller as recited in claim 1 further comprising:
   an output voltage detector configured to detect a bus voltage of said synchronous rectifier and produce therefrom a DC bus voltage; and
   a current control block, coupled to said output voltage detector, that applies a reference current vector based on said DC bus voltage to said uncompensated drive vector to yield said partially compensated drive vector.

4. The controller as recited in claim 1 further comprising a zero-crossing detector configured to detect a phase on one of said at least two rectifier input lines and produce therefrom a zero-crossing signal for said input line voltage detector.

5. The controller as recited in claim 4 wherein said zero-crossing detector further provides said zero-crossing signal for an input line current detector.

6. The controller as recited in claim 1 further comprising a 2–3 transform that transforms said excursion-compensated drive vector into signals suitable for a pulse-width modulated drive signal generator.

7. A method of vector-controlling a polyphase synchronous rectifier, comprising:
   detecting voltages on at least two rectifier input lines;
   producing therefrom a neutral excursion vector;
   detecting currents on at least two of said rectifier input lines;
   producing therefrom an uncompensated drive vector; and
   applying said neutral excursion vector to a partially compensated drive vector to yield an excursion-compensated drive vector suitable for generation of excursion-compensated pulse-width modulated drive signals for said synchronous rectifier.

8. The method as recited in claim 7 further comprising generating said excursion-compensated pulse-width modulated drive signals for said synchronous rectifier.

9. The method as recited in claim 7 further comprising transforming said excursion-compensated drive vector into signals suitable for a pulse-width modulated drive signal generator.

10. The method as recited in claim 7 further comprising:
    detecting a bus voltage of said synchronous rectifier;
    producing therefrom a DC bus voltage vector; and
    applying a reference current vector based on said DC bus voltage to said uncompensated drive vector to yield said partially compensated drive vector.

11. The method as recited in claim 7 further comprising:
    detecting a phase on one of said at least two rectifier input lines; and
    producing therefrom a zero-crossing signal for said input line voltage detector.

12. The method as recited in claim 11 further comprising further providing said zero-crossing signal for an input line current detector.

13. A three-phase synchronous rectifier, comprising:
    a plurality of power switches interposing three rectifier input lines and two rectifier output lines; and
    a vector controller, including:
        an input line voltage detector configured to detect voltages on at least two of said rectifier input lines and produce therefrom a neutral excursion vector,
        an input line current detector configured to detect currents on at least two of said rectifier input lines and produce therefrom an uncompensated drive vector,
        a neutral excursion compensator, coupled to said input line voltage detector and said input line current detector, that applies said neutral excursion vector to a partially compensated drive vector to yield an excursion-compensated drive vector, and
        a pulse-width modulated drive signal generator configured to produce excursion-compensated pulse-width modulated drive signals from said excursion-compensated drive vector and drive said plurality of drive switches based thereon.

14. The synchronous rectifier as recited in claim 13 further comprising a 2-3 transform that transforms said excursion-compensated drive vector into signals suitable for said pulse-width modulated drive signal generator.

15. The synchronous rectifier as recited in claim 13 further comprising a zero-crossing detector configured to detect a phase on one of said three rectifier input lines and produce therefrom a zero-crossing signal for said input line voltage detector.

16. The synchronous rectifier as recited in claim 15 wherein said zero-crossing detector further provides said zero-crossing signal for an input line current detector.

17. The synchronous rectifier as recited in claim 13 further comprising:
    an output voltage detector configured to detect a bus voltage across said two rectifier output lines and produce therefrom a DC bus voltage; and
    a current control block, coupled to said output voltage detector, that applies a reference current vector based on said DC bus voltage to said uncompensated drive vector to yield said partially compensated drive vector.

* * * * *